United States Patent [19]

Haar

[11] 4,382,395

[45] May 10, 1983

[54] LOADING DEVICE FOR A MACHINE TOOL, PARTICULARLY FOR MACHINING PANELS OF SHEET METAL OR OTHER MATERIALS

[76] Inventor: Thomas Haar, Mittelstieg 15, 2083 Halstenbek, Fed. Rep. of Germany

[21] Appl. No.: 253,324

[22] Filed: Apr. 2, 1981

[51] Int. Cl.³ .................... B21D 28/04; B23Q 15/24
[52] U.S. Cl. ............................... 83/71; 83/251; 83/268; 83/277; 83/367; 83/409; 83/417; 83/421; 271/14
[58] Field of Search ............ 83/71, 98, 251, 268, 83/277, 281, 367, 409, 419, 421, 417; 271/14

[56] References Cited

U.S. PATENT DOCUMENTS 4,162,641 7/1979 Stubbings .......................... 83/71

Primary Examiner—James M. Meister

Attorney, Agent, or Firm—Beveridge, DeGrandi & Kline

[57] ABSTRACT

Automatic loading device for automatically positioning of panels of sheet metal or the like and to transfer the panels to a feeding device of a machine tool, preferably a cutting press. The cutting press cuts a plurality of blanks out of the panel along a given pattern which is stored in a program. The program is controlling the cutting press and the feed device in synchronism in order to provide the blanks, e.g. lids for cans within minimum production time. The time when the loading device is working overlaps the production time for the preceeding panel, i.e. the aligning of the panel in the loading device took place when the preceeding panel is cut. As soon as the feeding device returns to the zero position the loading device transfers the next panel to the feeding device, the panel maintaining its precise aligned position. The feeding device starts to a new feed cycle.

21 Claims, 12 Drawing Figures

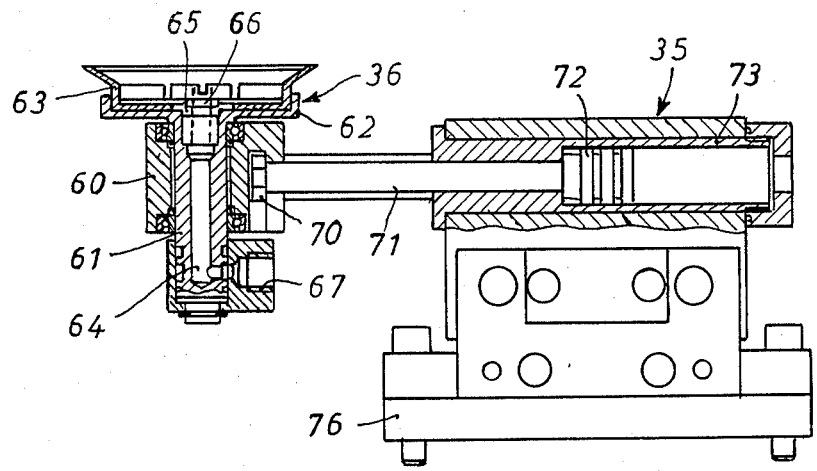
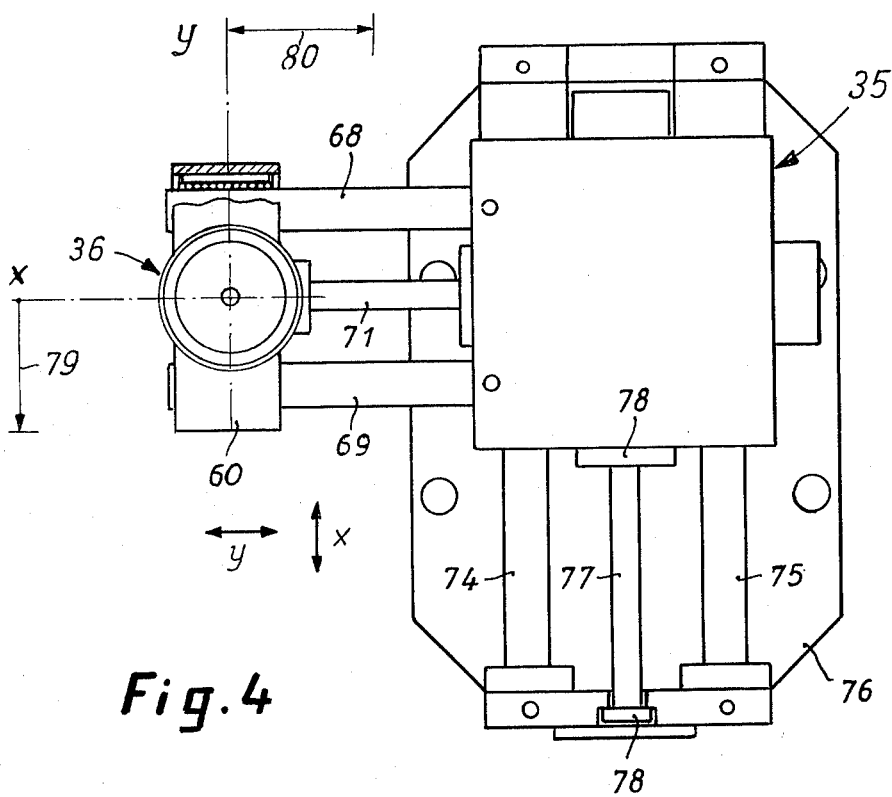

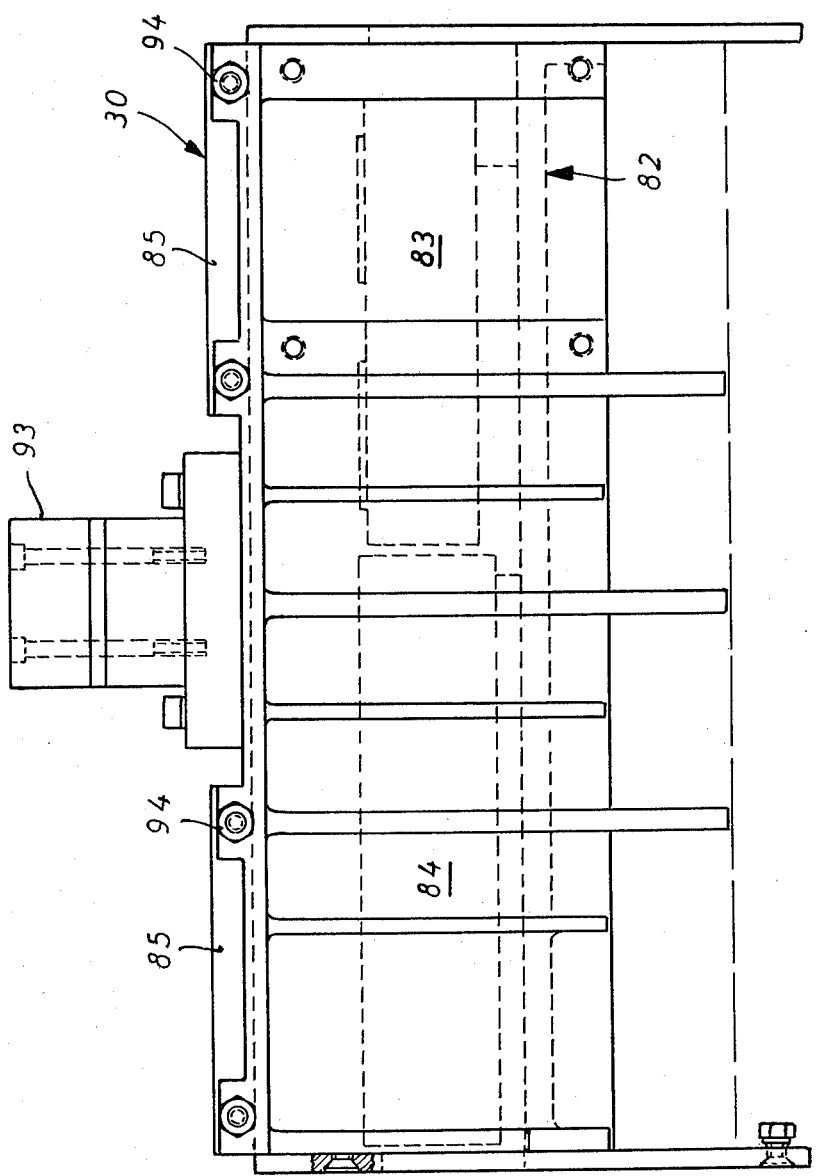

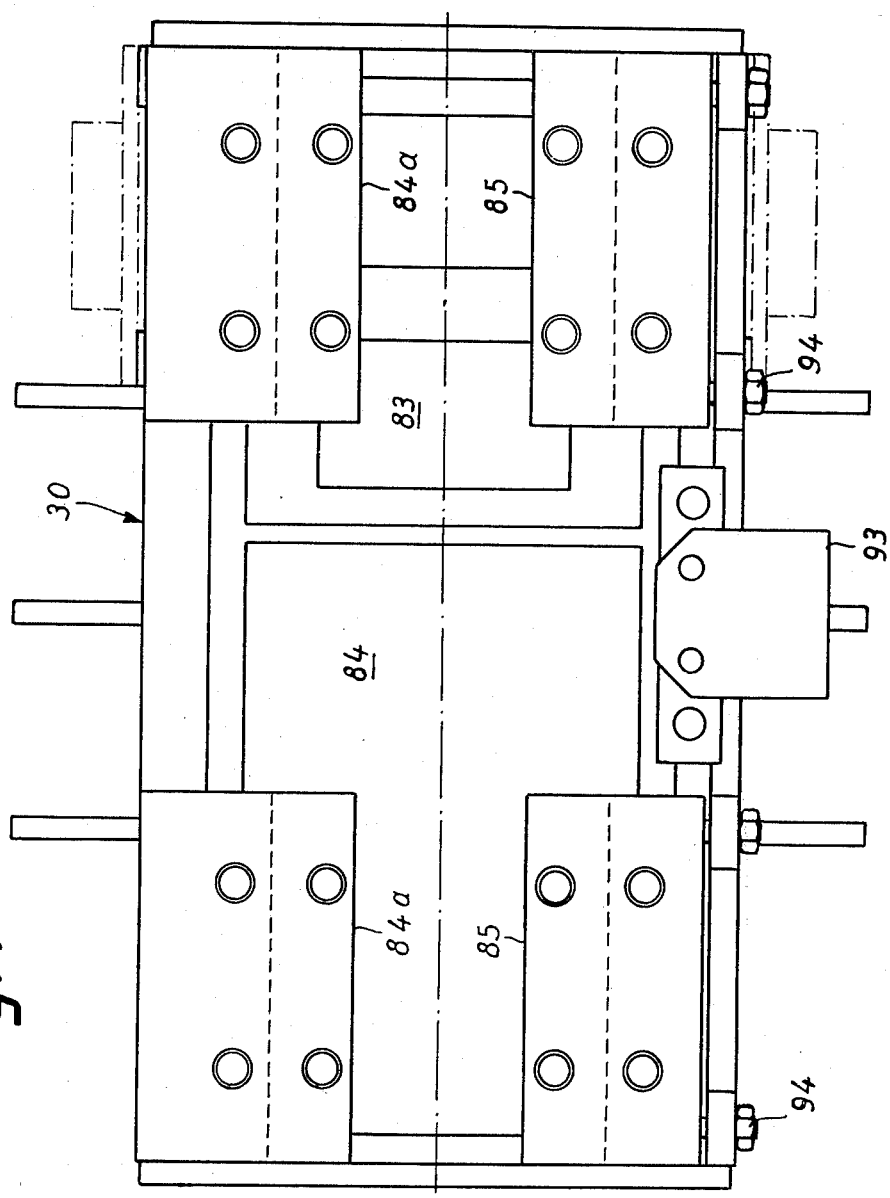

LOADING DEVICE FOR A MACHINE TOOL, PARTICULARLY FOR MACHINING PANELS OF SHEET METAL OR OTHER MATERIALS

One is often confronted with the problem of cutting blanks from panels of sheet metal, for instance, of aluminum, or other materials of different thicknesses. For this purpose, the panel is clamped in a feeding device and is moved between punch and die in such a manner that the latter cut a predetermined number of blanks out of the panel. For saving material it is required to obtain the largest possible number of blanks from a given panel area. The control of the feeding device normally is automatic, preferably by a known-per-se numerical control. The accuracy of the feed by the feeding device is dependent on the panel being received by the feeding device in the correct position. It is known to put the panels into the feeding device by an operator. In this connection it is also known to effect an automatic positioning. It is furthermore known to transfer the panels to the feeding device automatically (German patent application 26 40 379). The panels are taken from a stack one by one and placed onto a conveyor belt. Cooperating with the conveyor belt are means taking care that a lateral edge of the panel is automatically placed against a lateral guide adapted to be lowered. A sensor is arranged in the cutting device which senses the arrival of the front edge of the panel at the sensor. At this moment feeding tongs seize the rear edge of the panel and move the latter through the cutting device according to a predetermined control program.

The known devices have certain drawbacks. With a view to accuracy of positioning the known devices are not satisfactory. During the process of positioning, the machine tool is stopped so that the positioning time must be added to the production time. In case the formate of the panel is changed, a time consuming reassembling must be carried through. Finally, the positioning described in the German patent application P 26 40 379 can be performed satisfactorily only if the panels have a straight lateral edge.

Therefore, the invention is based upon the problem of providing a loading device for a machine tool for processing panels of sheet metal or other materials, by means of which the introduction, positioning and transfer of the panels can be performed fully automatically within the shortest possible introduction time. Furthermore, the loading system according to the invention is intended to operate independently in view of the sizes of the panels, their geometry, and of the cutting pattern.

This problem is solved in that the positioning device has a positioning plane between the supply means and the feeding means, with first and second abutment means provided at the positioning plane, the positioning device comprising positioning means which are adapted to be moved along two orthogonal axes by means of a positioning drive and to be brought into engagement with a panel, in order to place the latter at first against the first abutment means and subsequently against the second abutment means, with first or second abutment means engaging the rear edge of the panel looking into the direction of feeding, and in that loading means are provided adapted to be brought into engagement with the panel on the positioning plane, said loading means being driven by a loading drive to reciprocate linearly, in order to bring the panels from the aligned loading position into a predetermined forward transfer position in front of the gripping means of the feeding device when the latter are in their zero position, said loading means passing through beneath the feeding device and the automatic control means controlling the individual driving means in such a manner that the positioning of a panel takes place within the cycle during which the feeding device advances a preceding panel in the machine tool.

With the loading device according to the invention, a panel placed onto the positioning plane by the supply means is at first moved against the first abutment means and then against the second abutment means with the aid of the positioning drive. Preferably, the panel is at first moved against rear abutment means which are arranged on a line normal to the feeding direction. Following this, engagement with the second abutment means is effected, with the positioning drive moving the positioning means normal to the first direction of movement, but with the rear edge of the panel still contacting the first abutment means. If the automatic control means senses abutment of the panel at the first and second abutment means by means of suitable sensors, the panel will be in a defined position. It will then be engaged by loading means which in a clearance-free manner place the panel underneath the feeding means into the transfer position. In the transfer position which, as has been mentioned above, is in front of the gripping means of the feeding device, the gripping means then engage the rear edge of the panel and move the latter through the machine tool. The gripping means of the feeding device have a zero position to which they always return after completion of a processing step. As the transfer position and the zero position of feeding device are defined with respect to coordinates, the space between them also is defined. Accordingly, the transfer of the panel will always take place at one and the same point, that means independently of the size of the panel and also independently of the processing pattern, for instance, the cutting pattern. As the panel is seized from one and the same side both in the loading device and in the feeding device, the dimensions of the panel have no influence on the transfer action.

The placement of the panel against the abutment means which are arranged in two planes offset from each other through 90° enables loading and supply of the panels independently of the size of the panel and also independently of the shape of the edges thereof. The latter, however, comes true only if the abutment means are designed as abutment points. With abutment points, non-angularities and irregular edges cannot have any influence on the accuracy of later processing.

Apart from the precision obtained with the invention, the reduction in the overall production time has to be emphasized. While the machine tool processes the panel, the alignment of a further introduced panel may be carried through in the positioning device. Simultaneously with the return movement of the gripping means into the zero position or immediately after reaching the zero position the loading device can then adjust the panel into the transfer position so that the gripping means of the feeding device may engage this panel within the shortest possible time and move it into the machine tool. The duration of time in which the machine tool is stopped, thus has been reduced to the absolute minimum.

The invention is not restricted to cutting machines but may be used also for all machine tools in which a panel is processed at different locations on the panel.

When designing the device according to the invention for different formats of the control, preferably a numerical control, is to be programmed such that the feeding means after having engaged a panel will transport it to the initial position in the machine tool. If, on the contrary, only one single product is made on the machine tool out of panels of one and the same format, the last mentioned programming may be omitted. In this case, the loading device may advance the panel directly into the first processing position, and the transfer to the feed device may be effected during the first step of processing, for instance, during the first press stroke. The standstill time of the machine tool is then still more reduced.

The device according to the invention also allows the use of multiple tools which are arranged in a series. The number of machining operations per series such as cutting operations, for example, must be the same for all the series. Besides, the number of tools must be divisible by the number of machining steps per series to give an integer without remainder.

The positioning means preferably comprise a suction cup capable of elastic deformation, said cup being connected to a vacuum source and in addition being supported for rotational movement. The suction cup makes possible the compensation for uneven panel and forms a gastight sealing in the case of the vacuum so that, with the aid of the suction cup, the panel may be moved against the abutment means. The rotatable support of the suction cup allows in a simple manner alignment of the edges of the panel in contact with the abutment means. The slide transporting the suction cup is preferably pneumatically driven, i.e. at a relatively low pressure, in order to prevent the panel edge from running up too hard against the abutments which may subject it to bouncing or even becoming damaged. To avoid the so-called slipstick effect the pistons of the pneumatic cylinders are without sealing rings.

The suction cup may selectively be connected also to a source of compressed air, in order to free the suction cup from the panel. Furthermore, knubs or other means may be provided in the positioning plane enabling support of the panels at discrete points in order to prevent them from sticking at the underlayer too much, above all, when the panels are greased.

The loading means are likewise provided with tongs same as are the gripping means, said tongs being preferably driven by a pneumatic drive and securely seizing the panels on the upper and undersides thereof. The first abutments are preferably connected to the tongs so that with the panel being positioned along the first axis the rear edge of the respective panel will be disposed within the opened mouth of the loading tong.

The sensors likewise form preferably part of the abutments and are preferably designed as inductive approximation sensors. A resiliently biased flap may be disposed in front of the sensors. The panel edge moving against the abutments will at first engage the biased flaps, defining an armature, until the latter come to abut against the sensors. Such an arrangement reduces considerably the hysteresis of the inductive approximation sensors which thus are in a position to generate effective output signals.

It is still to be noted that the positioning device provided with the suction cup is suited only for smaller and medium size formats of the panels. In connection with larger panels other positioning means must be provided in order to move the panels against the mentioned first and second abutment means.

The guiding means for the feeding tongs of the feeding device preferably is supported at one end only of the machine frame, so that any panel formats that may be desired can be transferred from the loading device to the feeding device.

The drive for the loading device preferably is a known-per-se linear electric motor. This motor is constructed in the manner of an asynchronous motor with the winding, however, extending in one direction only, and thus generating a linearly moving electromagnetic field. The movable portion of the linear motor is connected to a slide for the loading means, said slide moving along a suitable low friction guide. The linear motor is furthermore connected to an eddy current brake braking the loading slide approximately in a midway position so that the latter will approach the transfer position at a reduced speed. In the end position, i.e. in the transfer position, the eddy current brake and the linear motor will have to be switched off for well-known reasons. The fixation of the loading slide in this position is obtained with the aid of magnet means. The same is equally the case for the rear position of the loading slide, i.e. in the loading position.

As the loading means of the loading device are passed through underneath the feeding device and, on the other hand, the rear edge must be seized by the feeding device gripping means, the guide for the loading slide preferably is arranged to be capable of height adjustment, so that the rear edge of the panel is first lifted in order to be capable of being seized by the gripping means of the feeding device, such as the tongs, for example. Following this, the guide will be lowered again, so that the loading means such as the loading tongs, for example, may return to the loading position by the loading slide.

In the following, an embodiment will be described in more detail by way of the drawings.

FIG. 3 shows a part-sectional view of the cross slide of the loading device according to the invention.

FIG. 4 shows a top plan view of the illustration in FIG. 3.

FIG. 6 shows a side view of the illustration in FIG. 5.

FIG. 7 shows a top plan view of the illustration in FIG. 6.

Figure 1:
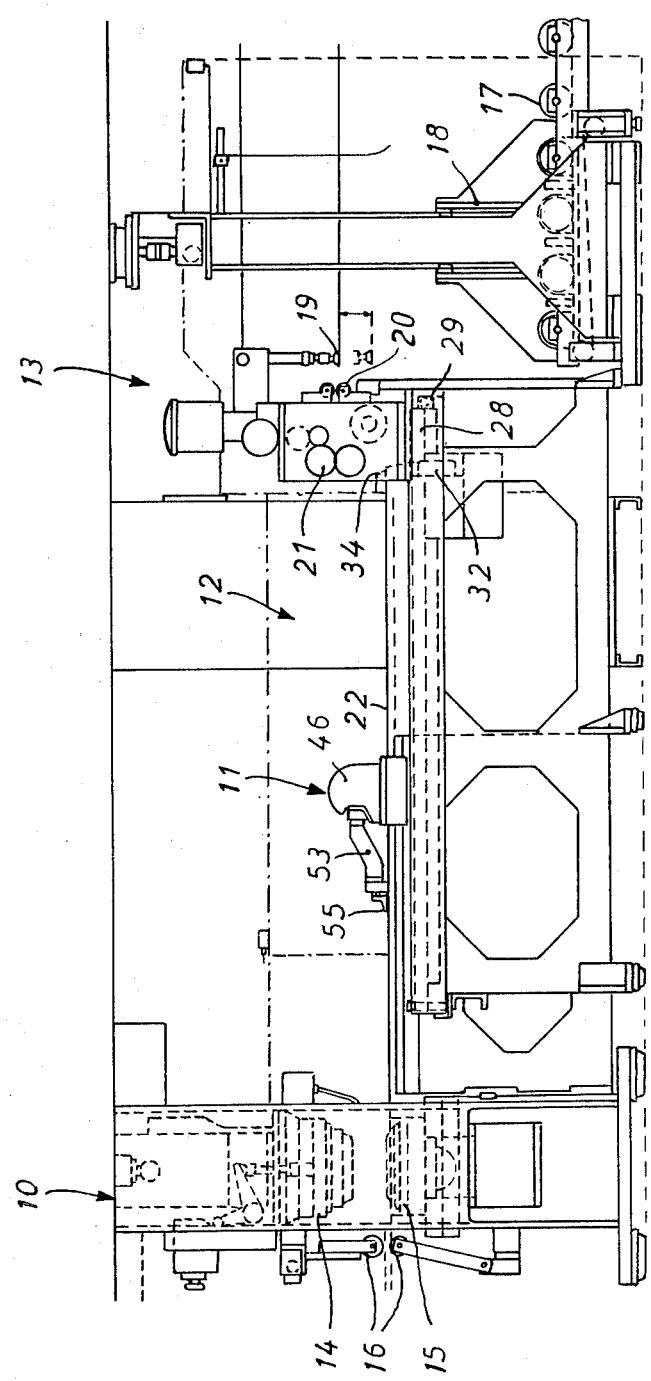
FIG. 1 shows a side view of a panel cutting machine provided with a loading device according to the invention.
Figure 2:
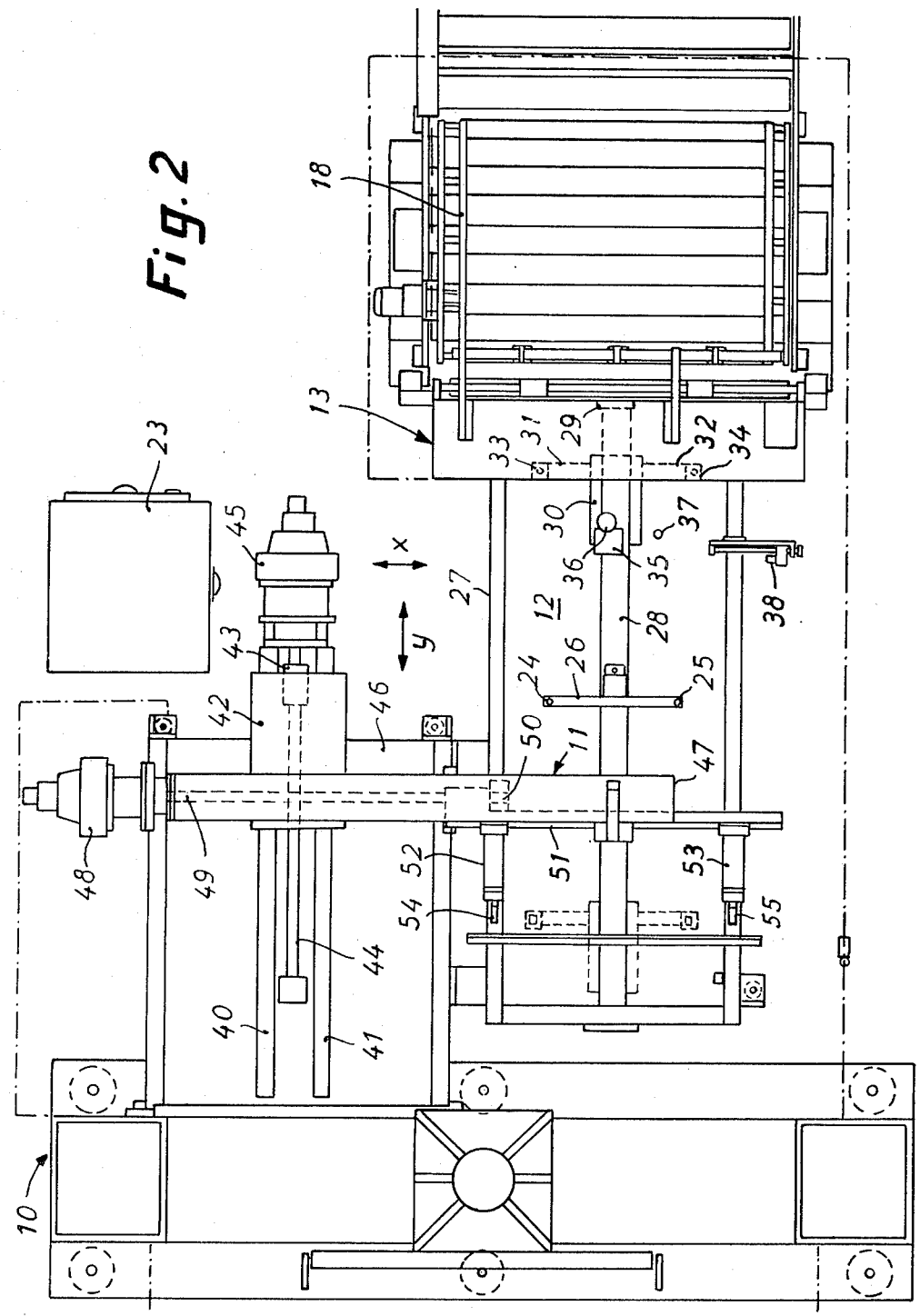
FIG. 2 shows a top plan view of the arrangement according to FIG. 1.

To begin with, reference is made to FIGS. 1 and 2. The device shown in these Figures consists of the following components: a cutting device 10, a feeding device 11 for the cutting device, a positioning and loading device 12, and a supply means 13. The cutting device 10 is of conventional design and thus is not going to be explained in detail. It comprises a punch 14 capable of up and down movement and a counter tool 15. Ejector rolls 16 are furthermore provided at the exit of the cutting means 10. The supply means 13 is likewise of conventional design. Stacks of panels (not shown) are transported to the supply means 13 via rollers 17 and are stepwisely lifted with by a lifting device 18 not shown in detail. The respectively upper panel is pushed into the gap between two supply rolls 20 with the aid of several vertically adjustable suction heads 19 (only one of them being shown in FIG. 1). The panel is engaged by a pair of greased rollers 21. Then, the panel drops onto the machine table 22 from above. The machine table extends between the supply means 13 and the cutting device 10 and is carried by suitable frame.

The operation of the cutting device 10 and the supply means 13 is controlled by means of an automatic control, which is accommodated in a housing 23. The automatic control, preferably a numerical control (NC), controls also the function of the components still to be described.

In FIG. 2, the table surface of the machine table 22 has been omitted in the interest of a better representation. Two limiting pins 24, 25 are to be seen which are retained at a transverse arm 26 and are capable of height adjustment by a suitable drive. In the extended position the limiting pins 24, 25 project through corresponding openings in the machine table 22 thereby limiting the movement of a panel coming from the supply device 13.

A guide rail 28 is furthermore provided in the frame 27 of the machine table 22. The guide rail 28 extend in the Y-direction, which at the same time corresponds to the direction of feed within the device shown, while the X-direction extends normal thereto. The guide rail 28 is pivotally supported at 27 at the rear end thereof (with respect to the feeding direction of a panel). At the front end, opposite thereto, the guide rail 28 is movable in height and may be lifted from below by means of two adjusting cylinders (not shown). One of the two adjusting cylinders has a longer stroke length than the other one.

A slide 30 is suspended from the guide rail 28 as will still have to be shown in more detail later on. The slide may move to and fro in the Y-direction. Its foremost position is indicated in FIG. 2 in dash-dotted lines. Arms 31, 32 are mounted to the slide 30 on opposite sides, the outer ends of said arms extending upwards and carrying loading tongs 33 and 34, respectively, which are extending upwards above the table surface 22. It goes without saying that corresponding through-going slots must be provided in the table surface so that the slide 30 may be travelled.

FIG. 2 furthermore shows a cross slide 35 provided with a suction head 36, which is likewise going still to be described in more detail in the following. The cross slide 35 is in a position with the aid of its drive to perform a limited movement both in the X- and in the Y-direction.

A detector 37 is furthermore recessed into the table surface 22 which will detect the presence of a panel. Furthermore, an abutment 38 is arranged on one side of the machine table 22, said abutment being capable of adjustment in the X-direction and being designed at the same time as a sensor.

Two guide rods 40, 41 are fixedly supported by the machine frame in a manner not shown in any more detail and are guiding a first feeding slide 42 which is connected to an adjusting nut 43. The adjusting nut 43 is in engagement with a threaded spindle 44 connected without clearance and without a gear to a disk type motor 45 of known construction. The first feeding slide 42 carries an arm 46 the free end 47 of which leaving a free space with respect to the table surface 22. A disk type motor 48 is connected to the other end of the arm 46 driving a threaded spindle 49 in a clearance-free manner and without a gear. An adjustment nut 50 is seated on the threaded spindle 49 and is connected to a second feeding slide 51 which is in addition guided by the arm 46 in a manner not shown in any more detail. Two parallel feeding arms 52, 53 are arranged at the slide 51 carrying feeding tongs 54, 55 at the forward ends thereof. The above mentioned automatic control also controls the motors 45 and 48 so that the feeding tongs 54, 55 may be moved in an X-direction and in a Y-direction. FIG. 2 shows the zero position of the feeding tongs 54, 55 to which they will always return after a panel having been advanced by them has been processed in the cutting device 10.

In the following, reference is made to FIGS. 3 and 4, which show the cross slide 35 and the suction head 36. To begin with, the suction head 36 will be described. In the through-going bore of a bearing member 60 a shaft 61 is rotatably supported with by anti-friction bearings. A plate 62 is integrally formed with the upper surface of the shaft 61 for the reception of a suction cup 63 of elastomeric material. The upper section of the suction cup 43 flares upwardly in the form of a conical ring. A throughbore 64 is provided in the shaft 61 which is in communication with openings 65, 66 in the plate 62 and the suction cup 63, respectively, at the upper end. At the lower end the bore 64 is connected to an inlet 67 which may be brought into connection (in a manner not shown) with a vacuum source or a source of compressed air.

The bearing member 60 slides on two parallel guide rods which are rigidly connected to the slide 35. The bearing member 60 is furthermore connected to the front end of the piston rod 71, as shown at 70, the piston 72 of which is disposed in a cylinder 73 inside the slide 35. As will be seen from FIG. 3, the piston 72 lacks sealing rings. It is lapped instead, in order to provide a relatively good metallic sealing. At the cylinder 73 a connection for compressed air is provided at either end on both sides of the piston. The slide 35 is on the one hand movably supported on two parallel guide rods 74, 75 which are mounted on the frame of the machine table 22 with the aid of a structural member 76 not described in any more detail. A piston rod 77 is connected to the structural member 76 at 78. The appertaining adjustment cylinder 78 is connected to the slide 35 in a manner not shown in any more detail An actuation of the piston rods 72 and 77 therefore causes movement of the suction head 36 in the X- and Y-direction. In the position shown in FIG. 4 the suction head 36 can be moved only in the direction of the arrow 79 along the X-axis and along the Y-axis in the direction of the arrow 80. The ways of adjustment are limited, as may be readily seen.

Figure 5:
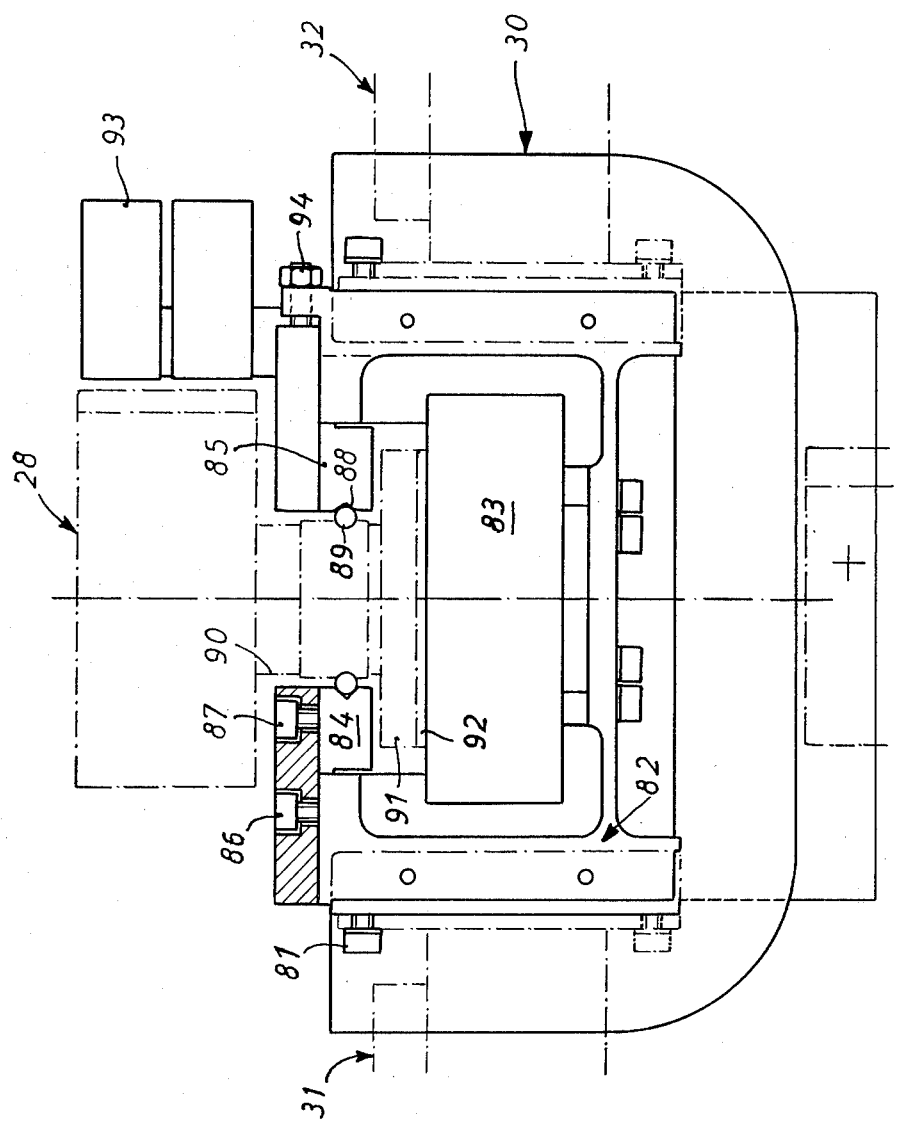
FIG. 5 shows a front view of a linear drive for the loading device according to the invention.

In the following, reference is made to FIGS. 5 to 7. As will be seen from FIG. 5, the loading slide 30 has a U-shaped cross section. In the slide 30 retaining means 82 is mounted with the aid of screws 81 for supporting a motor winding 83 and a eddy current brake 84 (FIG. 6) as well as with the aid of bearing shoes 84 and 85, which are fastened to the retaining means 82 with the aid of screws 86 and 87, respectively. The bearing shoes are provided with prismatic surfaces 88 on the side surfaces facing each other for the guidance of balls 89 which are guided in a horizontal plane endlessly around the bearing shoes 84, 85 (which, however, is not shown). As may be seen furthermore from FIG. 5, the guide rail 28 is formed with a double-T-cross sectional shape. Longitudinal grooves of semi-circular cross section are formed in the vertical web 90 of the guide rail 28 with the balls 89 running therein. Thus, the slide 30 is adjustably suspended from the guide rail 28 with the aid of the balls 89.

The motor portion 83 connected to the slide 30, as already mentioned, comprises an asynchronous motor winding, while the shortcircuit winding is formed by the transverse web 91 of a double-T-shape of the guide rail 28, the underside of which is plated with a copper layer 92. In this manner, a linear motor is formed driving the slide 30 forward and rearward along the guide 28. In the eddy current brake 84 (see FIGS. 6 and 7) a magnetic field is generated which cooperates with a shortcircuit winding likewise formed by the web 91 of the guide 28, in order to brake the movement of the slide 30.

On the slide 30 a switching cabinet is arranged for a sensor. It is furthermore to be noted that the bearing shoes 85 are supported for movement in a direction towards and away from the guide. The movable support makes possible the build-up of the biasing force under which the balls 89 are running in the associated guide tracks. For this purpose the bearing shoes 85 are cooperating with adjusting screws 94.

Figure 10:
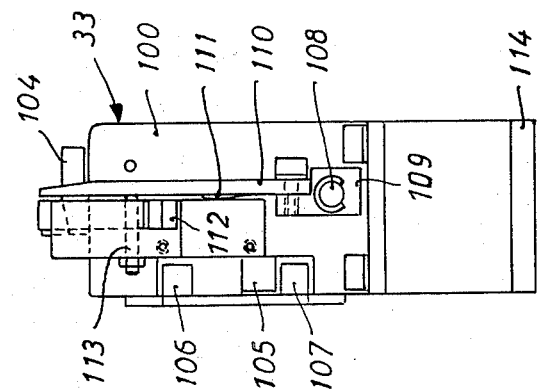
FIG. 10 shows another side view of the loading tong according to FIG. 8.
Figure 11:
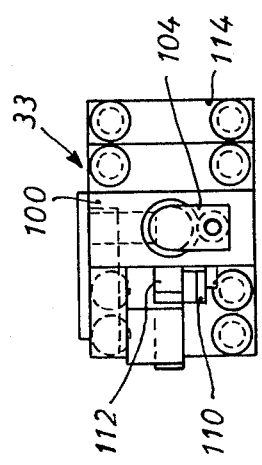
FIG. 11 shows a top plan view of the loading tong according to FIGS. 8 to 10.
Figure 8:
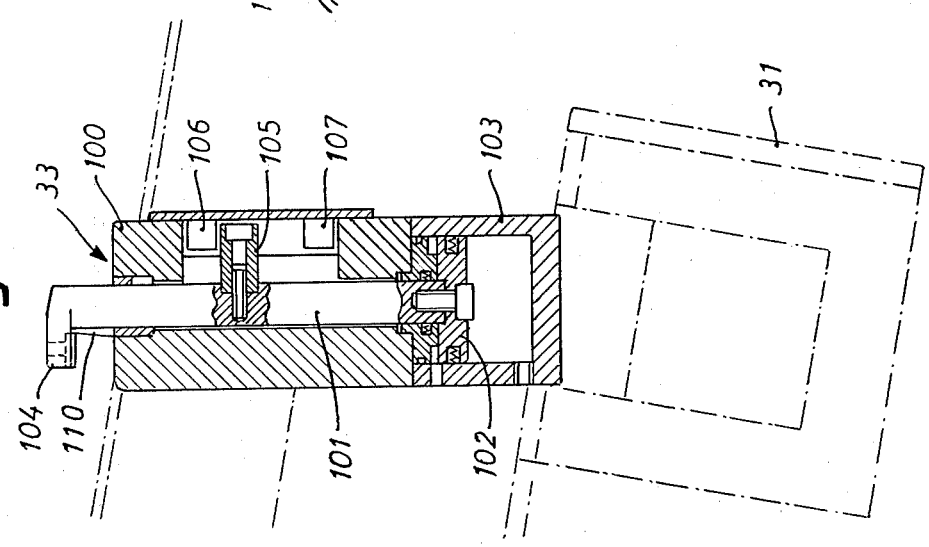
FIG. 8 shows a sectional view taken of a loading tong according to FIG. 5.

FIGS. 8 to 11 show the loading tong 33 mounted on the arm 31 which for its part is fastened to the slide 30. In FIG. 8 the upwardly projecting portion of the arm 31 is shown in an oblique position. Actually, this portion extends vertically upwards so that the tong 33 is slightly inclined forwardly (see also FIG. 1). The loading tong 33 which is of the same design as the loading tong 34, comprises a housing 100 with a throughbore, said throughbore accommodating a piston rod 101, connected to a piston 102 at the lower end thereof which piston is movably supported in a cylinder 103. At the other end the piston rod is provided with a claw 104 formed integrally therewith. In FIG. 8, the loading tong is shown in the open position and in FIG. 10 in the closed position. A cam 105 is connected to the piston rod with the aid of a screw, said cam during the movement of the piston rod 101 moving between an upper approximation sensor 106 and a lower approximation sensor 107 but maintaining a minimum switching distance from them. A bearing member 109 is pivotally supported at the housing 100 with the aid of a pin 108. The bearing member 109 has connected thereto a plate 110 or flap of hardened steel 110 which is biased to the right (in FIG. 10) with the aid of a leaf spring 11. The plate 110 cooperates with a sensor 112 providing a signal when the plate is disposed in the position as shown in FIG. 10 in which it lies in close contact against an abutment pin 113, being spaced thereby from the inductive sensor 112. Without any force being effective thereon the plate 110 will move to the right. This is shown in FIG. 11.

Figure 9:
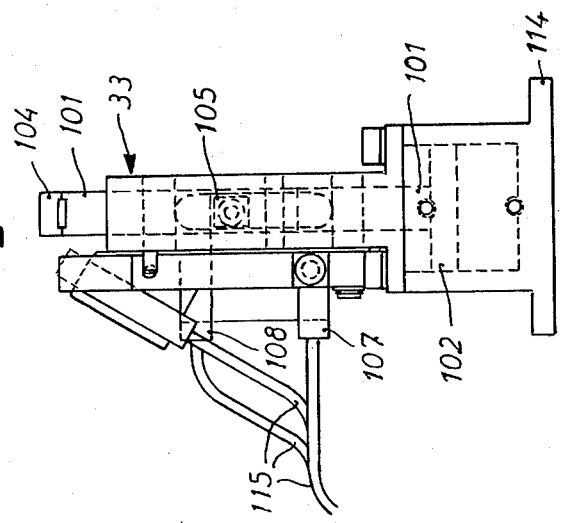
FIG. 9 shows a side view of the loading tong according to FIG. 8.

As will be seen from FIGS. 9 and 10, the entire loading tong 33 may be fastened on the carrying arm 31 with the aid of a socket 144 and screws.

The three sensors 105, 106 and 112 are connected to the automatic control in the housing 23 via suitable lines 115 (FIG. 2).

Figure 12:
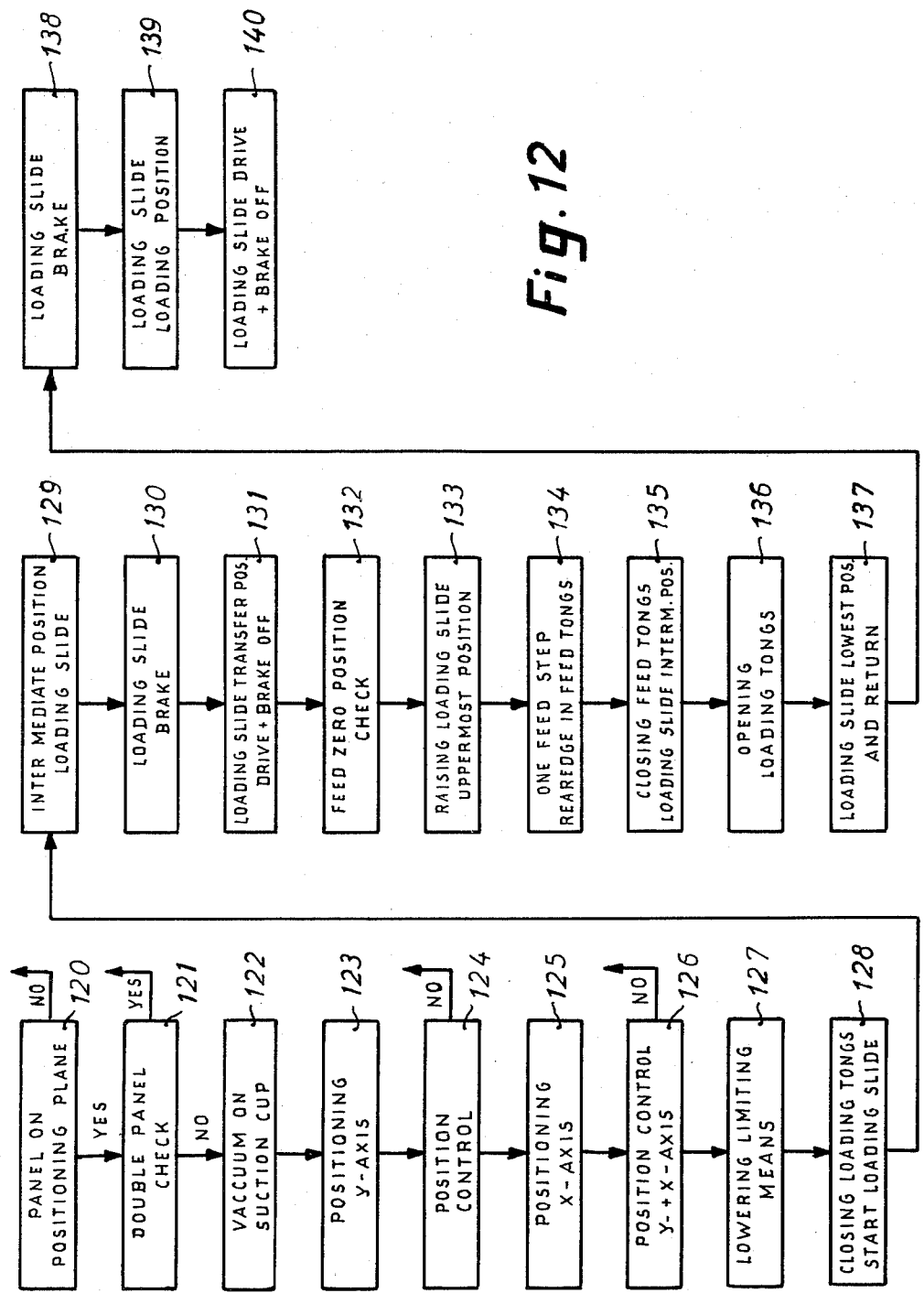
FIG. 12 shows a flow diagram of the mode of operation of the loading device according to the invention.

The mode of operation of the device as described will now be explained in more detail in the following by way of the flow sheet according to FIG. 12.

First, a panel is placed onto the table surface 22 by means of the supply means 13. The panels may be printed or also unprinted. They may also be so-called scroll panels. The upwardly extended abutment pins 24, 25 prevent the panel from sliding beyond said pins toward the feeding device 11. The presence of a panel in the positioning device 12 on the machine table 22 is detected in the block 120. Following this, a double panel check is performed, i.e. whether only one single panel has been supplied (block 121). Corresponding error signals will be transmitted to the automatic control device which will generate corresponding correction measures or alarm signals. After the double-panel check a vacuum source (not shown) is connected to the suction head 36 so that the latter will engage the panel at the underside thereof. The flexibility of the suction cup 63 takes care of sufficient sealing also in case of a corrugated or uneven panel (block 122). After the suction head 136 has engaged the panel the piston rod 21 is adjusted in the Y-direction. The pressure supplied to the cylinder 73 is relatively low, i.e. between 1 and 3 bar. With the special design of the piston 72 (without sealing rings) it is ensured that the piston 72 will start moving smoothly and without jerking. The panel (not shown) is adjusted in the Y-direction towards the supply means until its rear edge reaches one or both loading tongs 33, 34. During positioning in the Y-direction the rear edge of the panel will first contact the plates 110 at the loading tongs so that the latter will be pivoted into the position as shown in FIG. 10 towards the approximation sensor 112. At the moment when the plate 110 strikes against the abutment pin 113, the sensor 106 will generate an output signal. In case the rear edge of the panel does not reach the loading tongs 33,34 simultaneously, the rotatable support of the head 36 will ensure that by a corresponding pivotal movement of the panel the rear edge thereof will come to lie in close contact against the both abutment plates 110 of the loading tongs 33 and 34. As the position of the abutments of the loading tongs 33, 34 is defined, thus, positioning of the panel along the Y-axis has been effected. This is represented by block 123. In the control device an interrogation is carried out as to whether both sensors 112 of the loading tongs 33 and 34 are generating an output signal. If this is the case, positioning of the panel is ensured thereby. At this juncture it has to be noted that the abutment plate 110 is hardened so that it will not become damaged by the frequent strikes. The abutment plate 110 in addition offers the advantage that it keeps the hysteresis for the inductive approximation sensor 112 very small. Finally, it is easily possible with the aid of the abutment plate 110 also precisely to determine the position of an edge of a very thin panel. The positioncontrol of the automatic control means is taking place in block 124. Following this, positioning along the X-axis is carried out, namely in block 125. For this purpose the piston associated with piston rod 77 is actuated, the cylinder 78 of which moves the cross slide 35 in the X-direction until the lateral edge of the panel comes to abut against the lateral abutment 38 (see FIG. 2). An approximation sensor is provided also at the abutment 38 which generates an output signal when the associated edge of the panel has reached the abutment 38. During the positioning in the X-direction the panel is still retained against the abutment plates 110 of the loading tongs 33, 34 as before. After completion of the positioning in X-direction a position control is carried out with respect to the panel (block 126) interrogating the sensors in the loading tongs 33 and 34 in the abutment 38.

Thus, the loading tongs 33, 34 and the abutment 38 are forming three abutments. The geometry of the abutments is suitably selected in such a manner that it corresponds to the geometry of the points of contact in a printing machine (in the case of printed panels). In this manner it is possible to compensate for non-angularities and irregular edges, respectively, of the panels without any influence on the accuracy on the later processing.

The step of transferring the panels to the feeding means 11 may now be commenced. For this purpose, the limiting pins 24, 25 are lowered (block 127). The abutment 38 may also be constructed to be lowered when the aligned panel is transferred to the feeding device. During the positioning of the panels in Y-direction the loading tongs 33, 34 are opened (see FIG. 8). After the positioning control (block 126) is finished the claws 104 of the loading tongs 33, 34 are lowered, thereby tightly clamping between them the rear edge of the panel which is already disposed in the open mouth of the loading tongs 33, 34 during the positioning in Y-direction (block 128). The closing position of the loading tongs 33, 34 may be controlled once more with the aid of the control means. Following this, compressed air is charged into the suction head 36 so that the panel will become disengaged from the suction head 36. Thereupon the linear drive for the loading slide 30 is switched on. The linear motor starts moving and is checked in its position midway of its travel (block 129). It is also possible to stop the loading slide 30 in the midway position, if desired. Prior to obtaining the end position of the loading slide 30 which is shown in FIG. 2 in dash-dotted lines, the eddy current brake 84 is switched on, so that a wear-resistant two stroke drive is created (block 130). The loading slide 30 finally obtains its end position which again may be sensed by an approximation sensor. In this position, the linear motor and the eddy current brake are then switched off (block 131). The loading slide 30 is retained in its position by means of a magnetic arrangement (not shown). Feed of the loading slide 30 into the transfer position is, however, effected only when the feeding means is in the zero position.

While this process step has been running off the automatic control has controlled the feeding means 31 in such a manner that the panel gripped by the feeding tongs 55 is advanced in the manner as desired in the cutting means 10, in order to cut out, for example, a series of blanks from the panel. After this operation has been completed, the automatic control moves the feeding means 11 automatically into the zero position shown in FIGS. 1 and 2. In this position the transport of the panel is carried out with the aid of the loading slide so that the loading tongs 33, 34 must move through underneath the feeding slide 51 or the arm 46. For this purpose a corresponding space is provided for these parts above the machine table 22. The free end 47 in addition ensures the feeding of a panel independently of the width thereof into the position of transfer. The loading tongs 33, 34 in this arrangement are disposed within the space of the feeding tongs 54, 55 (see FIG. 2). Prior to transfer of the panel to the feeding means 11 a control is performed with respect to the zero position of the feeding device (block 132). In the position of transfer the edge of the panel received by the loading tongs 33, 34 is slightly spaced from the feeding tongs 54, 55 which are arranged by about 1 to 2 mm in rear of the edge of the panel. For the transfer onto the feeding device 11 the guide 28 at the front end is adjusted into an uppermost position (block 133) with the aid of a lifting cylinder (not shown). In this position the edge of the panel is located at the midheight of the opened mouth of the feeding tongs 54, 55. The panel in this arrangement is still fixed in the closed loading tongs 33, 34 at this point in time as before. As soon as the guide rail 28 has reached the uppermost position, the slide 42 of the feeding means 11 will run by a programmed distance in the direction of the cutting means 10, i.e. by about 15 mm. Thereby, the feeding tongs 42, 43 will overlap the rear margin of the panel (block 134). While the feeding tongs 54, 55 are closing, the guide rail 28 will be lowered onto an intermediate position, perhaps by displacing back the adjusting cylinder having the greatest stroke while the other adjusting cylinder remains its extended position. In the described intermediate position the edge of the panel is lowered from the midheight of the mouth of the opened feeding tong 54, 55 onto the upper edge of the lower mouth portion (block 135). Following this, the loading tongs 33, 34 are opened (block 136). Before the opening of the loading tong occurs, the feeding tongs 54, 55 are closing. The guide rail 28 is subsequently lowered into the lowermost position. The loading slide 30 travels back into the positioning position (block 137, FIG. 2). While the loading slide 30 starts to travel back into the positioning station, the feed of the feeding tongs 54, 55 is simultaneously started, in order to bring the panel into a predetermined first machining position. The initial feed of the panel with the aid of the tongs 54, 55 can at first be effected in the Y-direction only, because otherwise a collision might occur between the feeding tongs 54, 55 and the loading tongs 33, 34 which are now on the same level. As soon as the feeding and the loading system have moved away from each other, the feeding movement in X-direction may be released too. The feeding of the panel is performed synchronously with the actuation of the cutting means 10 in a manner known per se.

When returning the loading slide 30 is braked anew (block 138) and obtainment of the end position (loading position) is detected (block 139). Following this, the linear drive and the brake are again switched off. Also in the loading position the loading slide 30 is retained with the aid of a magnetic arrangement (not shown) (block 140).

It goes without saying that the positions of the individual parts described are sensed by suitable approximation sensors and signalled to the control device.

As will be recognized, the transfer from the positioning and loading device 12 onto the feeding means 11 is performed always at one and the same location, independently of the size of the panel and the programmed cutting pattern, respectively. As the panel is engaged from one and the same side both in the loading device and in the feeding device, the dimensions of the panel have no influence on the transfer action.

It is self-explanatory that the invention is not restricted to sheet metal panels.

I claim:
1. A loading device for a machine tool for machining panels which are singly placed onto a table one after the other with the aid of a supply means, said panels being brought into a predetermined position with the aid of a positioning means and subsequently engaged by gripping means of an automatic feeding means arranged above the machine table and moved into a machining position in the machine tool, the supply means and the feeding means being controlled by an automatic control device, preferably a numerical control, the improvement is characterized in that the positioning device comprises a positioning plane located between the supply means and the feeding means, first and second abutment means being provided at the positioning plane, the positioning device comprising positioning means adapted to be moved along two orthogonal axes by means of a positioning device and adapted to be brought into endgagement with a panel, in order to place it at first into contact with the first abutment means and subsequently with the second abutment means, with first or second abutment means getting into engagement with the rear edge of the panel looking in the direction of feeding, loading means being provided which are adapted to be brought into engagement with the panel in the positioning plane, said loading means being driven by means of a loading drive to reciprocate back and forth in order to bring the panel from the aligned loading position into a predetermined forward position of transfer in front of the gripping means of the feeding device, when the latter are disposed in the starting position, with the loading means passing through underneath the feeding means.

2. A loading device according to claim 1, characterized in that the first abutment means comprise two abutments spaced from each other which are arranged on a line normal to the direction of movement of the loading drive, and in that the positioning drive at first brings the sheet panel into engagement with the first abutment means.

3. A loading device according to claim 1 or 2, characterized in that the abutment means have sensors associated therewith.

4. A loading device according to claim 1 characterized in that the positioning means comprise an resiliently deformable suction cup adapted to be connected to a vacuum source and mounted on a slide arranged to be adjustable in the direction of feeding and normal thereto.

5. A loading device according to claim 4, characterized in that the slide is adapted to be driven by a pneumatic drive and the pressure of the driving medium is low, preferably between 1 and 3 bar.

6. A loading device according to claim 4 or 5, characterized in that the suction cup is supported for rotational movement.

7. A loading device according to claim 5, characterized in that the pressure of the driving medium is temporarily sustained after the panel has been brought into contact against the first and second abutment means, until the loading means have seized the panel.

8. A loading device according to claim 4, characterized in that the suction cup is adapted to be selectively connected also to a source of compressed air.

9. A loading device according to claim 1, characterized in that the loading means comprise two loading tongs capable of being opened and closed by means of a tong drive, said tongs being arranged in such a manner that the rear edge of the aligned sheet panel is disposed in the opened mouth of the tong.

10. A loading device according to claim 9, characterized in that the first abutment means are mounted on the tongs.

11. A loading device according to claim 3, characterized in that the sensors are inductive approximation sensors having a pivotable armature plate of ferromagnetic material arranged in front of them which is biased by spring means into a position in front of the approximation sensors and is brought to lie in close contact against the approximation sensors when it is engaged by the facing of the panel.

12. A loading device according to claim 1, characterized in that the gripping means of the feeding device are provided with tongs adapted to be opened and closed by means of a tong drive and which are arranged on a feeding slide which is displaceably supported at a guiding arm extending vertically of the feeding direction above the machine table while supported only on the one side of the machine table, said guiding arm being capable of being driven in the feeding direction with the aid of a first feeding drive and the feeding slide being capable of being driven along the guiding arm with the aid of second feeding drive supported on the guiding arm.

13. A loading device according to claim 9 or 12, characterized in that the paths of movement of the loading tongs are between the paths of the feeding tongs.

14. A loading device according to claim 1, characterized in that the loading means are supported at a loading slide guided along a loading slide guide linearly in parallel with the feeding device and capable of being reciprocatingly adjusted by the loading drive between a forward end position (transfer position) in which the loading means are disposed in front of the feeding device in the zero position thereof, and a rearward position (loading position) into the positioning device.

15. A loading device according to claim 14, characterized in that the loading slide guide comprises a guide beam with the loading slide suspended therefrom, and with supporting arms arranged laterally of the loading slide extending upwards as far as to the height of the positioning plane and retaining the positioning means.

16. A loading device according to claim 12 or 15, characterized in that the guide beam is pivotally supported at its end facing the positioning device, and a lifting device is adapted to reciprocatingly adjust the other free end of the guide beam between an upper position in which the opened loading tongs accommodate the rear edge of the panel after the panel has been brought into the transfer position in front of the feeding device, an intermediate position in which the rear edge of the panel is lowered while it is disposed in the opened feeding tong, and a lower position, in which the loading slide is adjusted back into the starting position in the positioning device.

17. A loading device according to claim 14, characterized in that the loading drive comprises a linear motor and the loading slide is connected to the movable part of the linear motor.

18. A loading device according to claim 17, characterized in that the linear motor has associated thereto an eddy current brake which brakes the slide prior to reaching the front end position.

19. A loading device according to claim 14 or 15, characterized in that magnetic means are provided at the ends of the loading guide beam which retain the slide in the end positions while the automatic control device switches off the linear motor and the eddy current brake.

20. A loading device according to claim 1, characterized in that limiting means are provided adapted to be lowered below the positioning plane which limiting means limits the movement of the panel in the feeding direction when the supply means places a sheet panel onto the positioning plane.

21. A loading device according to claim 1, characterized in that a presence sensor is arranged in the positioning plane the output signal of which is transmitted onto the automatic control device.

* * * * *